UNITED STATES PATENT OFFICE 2,626,931

POLYMERIZATION PRODUCTS AND PROCESS OF PREPARING THEM

Herbert Bestian, Frankfort-on-the-Main-Hochst, Germany, assignor to Farbwerke Hoechst vormals Meister Lucius & Bruning, Frankfort-on-the-Main-Hochst, Germany No Drawing. Application May 26, 1949, Serial No. 95,590. In Germany October 1, 1948

10 Claims. (Cl. 260—2)

The invention relates to nitrogen containing polymerization products and to a process of preparing them. It is an object of the invention to prepare polymerization products of compounds of the following formula:

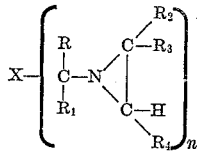

wherein X stands for an organic radical, R means hydrogen, lower alkyl, aryl, the carboxylic salt, ester, amide, or nitrile group, $R_1$, $R_2$, $R_3$, $R_4$ stand for hydrogen or lower alkyl and $n$ is an integer from 1 to 4.

A further object of the present invention is an easy method of preparing such polymerization products. Thus, the invention relates to a method of polymerizing compounds of the above formula by means of catalysts selected from the group consisting of neutral sulfuric esters and sulfonic esters.

The parent materials to be polymerized according to the invention may be prepared by addition of $\alpha.\beta$-alkylene imines to compounds with reactive carbon double bonds. For instance, there enter into consideration the addition products of $\alpha.\beta$-alkylene imines, especially of ethylene imine, to salts, esters, amides, or nitriles of acrylic acid, methacylic acid, crotonic acid, sorbic acid, itaconic acid, cinnamic acid, fumaric acid, maleic acid, muconic acid or to vinylmethylketone, vinylphenylketone, crotonaldehyde, cinnamicaldehyde or the like. Furthermore, the products which contain the grouping:

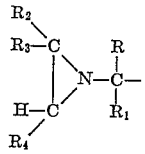

several times, i. e. 2, 3, or 4 times, may be used as parent materials for the polymerization. Special attention is drawn to compounds which are obtained from $\alpha.\beta$-alkylene imines and $\alpha.\beta$-olefine carboxylic esters of polyhydric alcohols.

Suitable $\alpha.\beta$-olefine-carboxylic esters are, for instance, the crotonic esters of ethylene glycol, propylene glycol, 1.3- and 1.4-butylene glycol, 1.6-hexamethylene glycol, dihydroxy-diethylether, dihydroxy-diethylsulfide, glycerol, 1. 3. 5-hexanetriol, pentaerythrite or the like. Instead of the crotonic esters, the esters of polyhydric alcohols of the following $\alpha.\beta$-olefine carboxylic acids may be used: acrylic acid, methacrylic acid, tiglic acid, $\alpha.\beta$-dimethylacrylic acid, $\alpha$-cyancrotonic acid, sorbic acid, $\alpha$-cyansorbic acid, cinnamic acid or the like.

As $\alpha.\beta$-alkylene imines there are mentioned besides the ethylene imine: 1.2-propylene imine, 1.2-butylene imine, 2.3-butylene imine, 1.1-dimethylethylene imine, C-butylethylene imine and other 1.2-alkylene imines as they are, for instance, obtained by reaction of C-alkylethanolamine sulfuric acid esters with aqueous solutions of alkaline hydroxides.

Of course, not only the compounds obtained by addition of alkylene imines to carbon double bonds enter into questions for the polymerization, but the starting materials for the polymerization according to the present invention may be prepared in other ways. There are obtained, for instance, by reaction of $\alpha.\beta$-alkylene oxides with ethylene imine, hydroxy-alkylethylene imines, for instance, $\beta$-hydroxy-ethylethylene imine and $\beta$-hydroxy-propylethylene imine. Furthermore, compounds containing the chloromethyl group may be reacted with $\alpha.\beta$-alkylene imines. For instance, dimethylaminoethyl chloride and ethylene imine yield N.N-dimethyl-N'.N'-ethylene ethylene diamine and phenylethyl chloride with ethylene imine yields $\beta$-ethylene imino-ethylbenzene. Also such compounds may be polymerized according to the present invention and yield valuable products.

The following compounds may be polymerized according to the present invention, but the invention is not restricted to them: the salts, esters, amides or nitriles of ethylene imino acetic acid

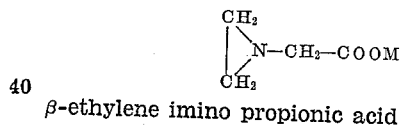

$\beta$-ethylene imino propionic acid

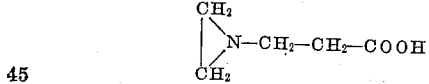

$\beta$-ethylene imino butyric acid

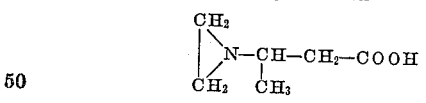

$\beta$-propylene imino-iso-butyric acid

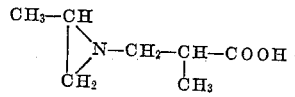

ethylene imino succinic acid

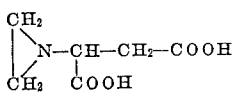

the condensation product of itaconic acid and ethylene imine

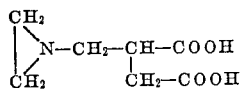

β-ethylene imino-β-phenyl propionic acid

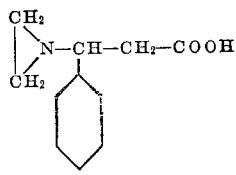

β,β'-bis-ethylene imino-adipic acid

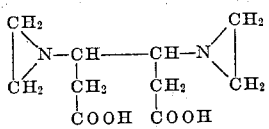

α-ethylene imino succinic acid dinitrile

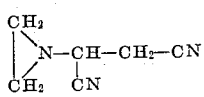

Furthermore, there may be mentioned:

β-ethylene imino ethyl methyl ketone

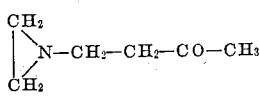

β-ethylene imino butyraldehyde

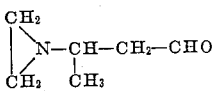

β-hydroxy ethyl ethylene imine

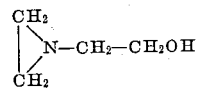

β-ethylene imino ethyl methyl sulfone

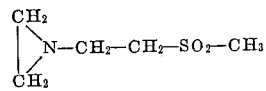

bis-β-ethylene imino-ethyl sulfone

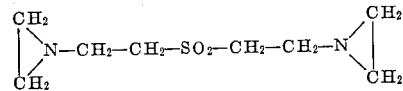

N.N-dimethyl-N'.N'-ethylene-ethylene diamine

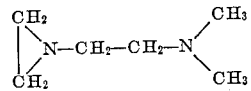

It is an object of the present invention to prepare polymerization products of compounds having the general formula:

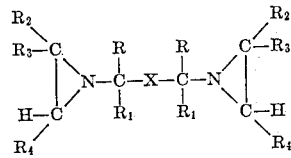

wherein all the letters R have the meaning given above and X stands for a bivalent organic radical, and especially stands for an organic radical containing two carboxylic ester groups. For instance, there may be polymerized according to the present invention compounds of the formula

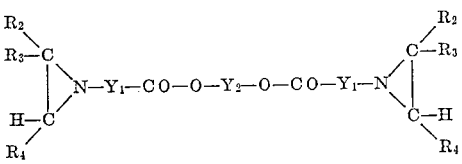

wherein $Y_1$ stands for lower aliphatic, araliphatic or isocyclic hydrocarbon radicals and $Y_2$ means an aliphatic hydrocarbon radical, the carbon chain of which may be interrupted by oxygen or sulfur atoms. Compounds derived from ethylene imine are of special importance, as they are easily available on a commercial scale. There may be named the compound obtained by reacting ethylene imine with the condensation product of crotonic acid and ethylene glycol

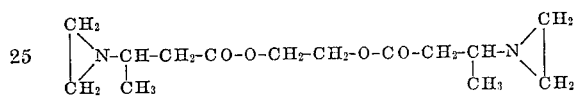

In the above formula the group —CH$_2$—CH$_2$— may be replaced e. g. by —CH$_2$—CH$_2$—CH$_2$—

—CH$_2$—CH$_2$—CH$_2$—CH$_2$—
—CH$_2$—CH$_2$—CH$_2$—CH$_2$—CH$_2$—CH$_2$—
—CH$_2$—CH$_2$—O—CH$_2$—CH$_2$—
—CH$_2$—CH$_2$—S—CH$_2$—CH$_2$—

The group

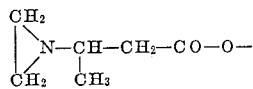

as indicated above, may be replaced for instance by

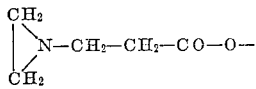

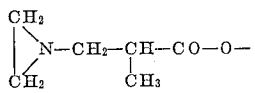

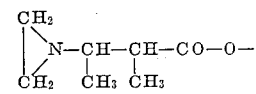

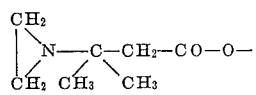

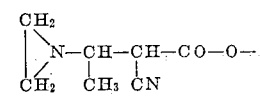

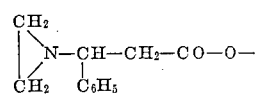

Polymerization products of compounds containing the reactive ethylene imino group three or four times, are also within the scope of the present invention.

There may be named

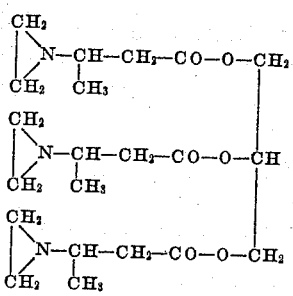

or

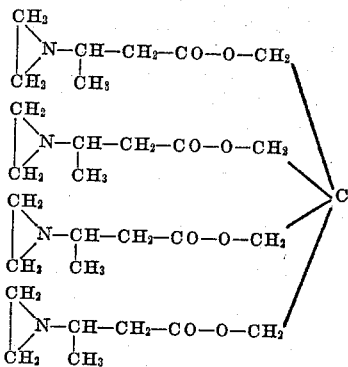

The two last named compounds containing three or four functional groups are derived from glycerol and pentaerythrite, respectively. 1.3.5-hexanetriol may also be used as basic material. Crotonic acid, used as starting material for the preparation of the said compounds, may be replaced by other unsaturated acids.

According to the invention the polymerization is effected by means of neutral sulfuric and sulfonic esters as catalysts. In case of compounds polymerizing very readily, even 0.1 to 0.01% of a catalyst may have a polymerizing action. In general, 0.1 to 1% will be added. Larger quantities may, however, be used likewise. Suitable are, for instance, all dialkylsulfates, such as dimethyl-, diethyl-, dipropyl-, dibutylsulfate or the like, furthermore, alcohol-esters of aliphatic, aromatic and heterocyclic sulfonic acids, such as methane-sulfonic methylester, methane-sulfonic ethylester, methane sulfonic butylester, benzene sulfonic methylester, benzene sulfonic ethylester, benzene sulfonic octylester, toluene sulfonic propylester or the like. The methyl-esters are in general the most active catalysts; the larger the alkyl radical, the slower the polymerizing action. By suitable selection of the catalyst and variation of its quantity any desired polymerization rate may be obtained.

The neutral sulfuric and sulfonic esters mix very readily with alkylene imine compounds used according to the invention. For the sake of a better dosing, they may also be dissolved in a neutral solvent.

The above statements about the quantities of the catalysts are, of course, only valid if the latter do not chemically react with the compounds to be polymerized. If, for instance, primary or secondary amino groups are present in the molecule, they are at first alkylated by dialkylsulfates. Only an excess of dialkylsulfate then acts as a catalyst.

In those cases in which the alkylene imine compounds contain, for instance, in the form of difficultly separable impurities, small amounts of substances containing primary or secondary amino-groups, the full effect of the said catalysts may be obtained by the addition of substances reacting with the amino groups, for instance, isocyanic ester.

With all compounds as described above, the polymerization takes place even at room temperature. But it is also possible to polymerize at temperatures below 0° C. On the other hand, the polymerization may be accelerated by effecting it at elevated temperature. In case of a quick polymerization, especially in block polymerization, care must be taken to remove the polymerization heat by cooling. The polymerization may also be effected in a solvent or a distributing agent.

The alkylene imine compounds may be polymerized either alone or in mixture with each other. In this way it is possible to vary the properties of the polymerizates to a large extent.

Furthermore, it is possible to prepare the polymerization products on a suitable substratum, for instance, wood, paper, leather, glass- or textile-fibers. Prior to the polymerization, filling substances of organic or inorganic nature, with the exception of strongly acid compounds, may also be added. In such cases it may be advisable to impregnate or to mix the substratum or the filling substance with the necessary quantity of a suitable sulfuric or sulfonic ester and to apply or to admix only then the alkylene imine compound to be polymerized. Finally it is possible to add, prior to the polymerization, soluble dyestuffs or pigments in order to obtain colored polymerization products also in such cases in which a subsequent coloring is not possible.

The polymerizates differ widely from each other according to the starting materials used. There may be obtained viscous and resin-like liquids, soft caoutchouc-like masses, horn-like plastics, and glass-like, infusible substances incapable of being molded. Some of these polymerization products are easily soluble in water or in solvents, others are very stable against all solvents and partly also against chemical reagents.

The polymerization products obtained according to the invention may be used for various technical purposes, for instance, in the textile and plastics industries. In such cases in which a subsequent shaping of the polymerizates it not possible on account of chelation, the easily realizable polymerization of the liquid monomeric compounds may be used for numerous technical purposes, for instance, for gluing and cementing in various ways, for surface protection against humidity and corrosion, for the preparation of colored coatings, glazings or lacquerings, furthermore, for cast and molded bodies, anatomic models or the like.

Reference is made to my copending application, Serial No. 95,589, filed concurrently herewith, in which certain of the monomers employed in the present case are described and claimed.

The following examples serve to illustrate the invention, but they are not intended to limit it thereto; the parts are by weight and the temperatures are given in centigrade degrees:

(1) 100 parts of β-ethylene imino propionic methylester are mixed with 0.5 part of di-n-propylsulfate, while stirring. After 24 hours, a highly viscous, sticky oil is obtained which is easily soluble in cold water and in most organic solvents.

(2) 100 parts of β-ethylene imino propionitrile are mixed with 0.25 part of methane sulfonic propylester and slowly polymerized between two glass plates, distant from each other by 1 cm. and fixed by a suitable adhesive tape so as to form a cuvette. The whole is heated on the water-bath for 3 hours at 30°, then for 3 hours at 40° and, finally, for 64 hours at 45° C. The block polymerizate obtained has a horn-like consistency. It is distinguished by a high viscosity. At temperatures above 100° it begins to soften and may be molded like other thermoplastics. On account of its sensibility to oxygen, processing at higher temperatures must be performed in the presence of nitrogen.

(3) 100 parts of ethylene imino succinic diethylester are mixed with 0.5 part of diethyl sulfate. After about 20 to 30 minutes, polymerization sets in with slight spontaneous heating. By cooling with water and stirring care is taken that the temperature does not exceed 30°. A colorless, resin-like polymerizate is obtained which is insoluble in water, but easily soluble in acetic ester and other organic solvents.

(4) 0.5 part of dibutylsulfate is introduced into 100 parts of bis-β-ethylene imino butyric ethylene ester, while stirring, and the whole is polymerized between two glass plates as described in Example 2. The polymerization is carried through without external heating. For removing the polymerization heat, the polymerization form is advantageously placed into water. After 1 to 2 hours, the liquid begins to solidify. The polymerizate gradually becomes harder and, after 24 hours, the polymerization has progressed to such an extent that the glass plates may be detached from the polymerizate by heating. The polymerizate is obtained in the form of a colorless organic glass which is distinguished by a great hardness and excellent mechanical strength. It may be tooled by sawing, boring, and turning.

When pouring the ethylene imine ester, mixed with the catalyst, on a suitable support, for instance, on glass, a colorless film is obtained, after polymerization, which is very stable against water and aqueous alkalies as well as against organic solvents.

(5) 90 parts of bis-β-ethylene imino butyric acid-1.3-butylene ester and 10 parts of β-ethylene imino propionitrile are mixed and polymerized with 0.5 part of benzene sulfonic ethylester at 20° C. A colorless, glass-like polymerizate is obtained which is distinguished by great hardness and high elasticity.

(6) A mixture of 95 parts of β-ethylene imino propionitrile and 5 parts of bis-β-ethylene imino propionic-1.3-butylene-ester are stirred with 0.5% of methane sulfonic butylester and then polymerized between 2 glass plates according to Example 2. By placing the form into water of 20°, a constant temperature is maintained during the polymerization. The polymerizate obtained resembles milk glass and has a horn-like toughness and elasticity.

(7) 100 parts of β-ethylene imino butyric hydroxyethyl ester are mixed with 0.5 part of benzene sulfonic ethylester and polymerized by being allowed to stand at room temperature. A rubber-like colorless mass is obtained.

(8) 100 parts of β-hydroxy-ethylethylene imine (prepared by addition of ethylene oxide to ethylene imine) are mixed with 0.4 part of methane sulfonic ethylester and polymerized while stirring and cooling at 20–30°. A viscous mass is obtained which dissolves in water.

(9) 100 parts of bis-β-ethylene imino ethylsulfone (prepared by addition of 2 mols of ethylene imine to divinyl sulfone) are polymerized at room temperature with 0.5 part of benzene sulfonic butylester. A colorless, glass-like polymerizate is obtained which is distinguished by a great hardness.

(10) 100 parts of ethylene imino acetic methylester (prepared from chloro-acetic methylester and ethylene imine in the presence of triethylamine) are stirred with 0.5 part of di-n-butylsulfate. After a few minutes, polymerization sets in with constant evolution of heat. The temperature is kept for ½ hour at 50–60°. Thereupon, 0.5 part of diethylsulfate is added, drop by drop, to the viscous oil, while vigorously stirring, and the polymerization is brought to an end at 50–60°. After 4 hours, a highly viscous, nearly colorless oil has formed which is easily soluble in water and most of the usual organic solvents.

(11) 100 parts of β-phenylethyl-ethylene imine, prepared from N-(β-phenylethyl)-hydroxyethylamine-sulfuric ester, are mixed with 0.5 part of diethylsulfate at 20°, while stirring. After a short time, polymerization sets in with faint disengagement of heat. The temperature is kept at 30–40° C. by taking care that the polymerization heat is removed by external cooling. After 2 to 3 hours, 0.5 part of dimethylsulfate is added, while stirring, and the temperature is allowed to rise slowly to 80°. Heating is continued for 1 hour at 80–100° C. and the whole is then allowed to cool. The polymeric compound obtained is a highly viscous, nearly colorless oil which is insoluble in water and dilute acids.

(12) 2 parts of a black oil-soluble dyestuff are dissolved in 200 parts of bis-(β-ethylene imino butyric acid)-diglycolester of the formula:

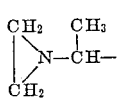N—CH—CH₂—CO—O—CH₂—CH₂—O—CH₂—CH₂—O—CO—CH₂—CH—N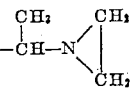

1 part of di-n-butylsulfate is then added, while stirring. The deep black oil is filled into a cuvette prepared by sticking together glass plates, distant from one another by 1 cm. After 1 to 2 hours, the oil has lost its fluidity and has become jellied. By placing the cuvette into water of 20° care is taken to well remove the polymerization heat. The polymerizate which is at first gel-like hardens more and more and after 48 hours has become hard as glass. After removal of the glass plates, a deep black plate is obtained which has a high surface luster and an excellent stability against water, alkalies and most of the usual solvents.

(13) 100 parts of tris-(β-ethylene imino butyric)-glycerol ester of the formula:

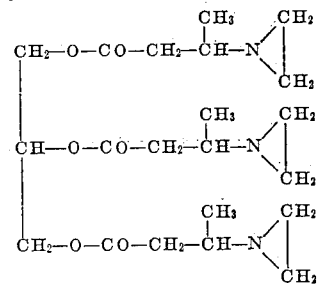

are stirred with 1 part of di-n-propylsulfate and then intimately mixed with 20 parts of titanium dioxide and 10 parts of copper phthalocyanine in pigment form. The thickly liquid mass is applied, 1 mm. in thickness, to a cement plate.

After 3 hours, jellying takes place and, after 24 hours, complete hardening yields a light blue, well adhering glazing of excellent resistance to impact and fastness to rubbing.

(14) 200 parts of bis-($\beta$-1.2-propylene imino butyric)-glycol ester of the formula:

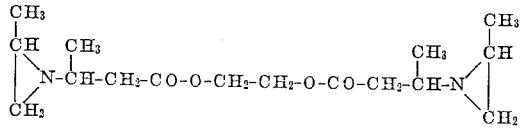

are stirred with 1 part of di-n-butylsulfate and the whole is then heated for 5 hours at 100° C. After 2 hours, the liquid has been transformed into a gel and gradually assumes a brown coloration. Finally, a brown-red polymerizate of caoutchouc-like consistency is obtained which shows a good stability against water and the usual organic solvents.

I claim:

1. Polymerization products of compounds having the general formula:

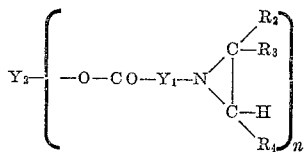

wherein $Y_1$ stands for a low molecular aliphatic hydrocarbon radical, $Y_2$ means a member of the group consisting of aliphatic hydrocarbon radicals, aliphatic hydrocarbon radicals the chain of which is interrupted by oxygen, and aliphatic hydrocarbon radicals the chain of which is interrupted by sulfur, $R_2$, $R_3$, $R_4$ stand for members of the group consisting of hydrogen and low molecular alkyl radicals, and $n$ means an integer from 2 to 4.

2. The process of polymerizing products having the general formula:

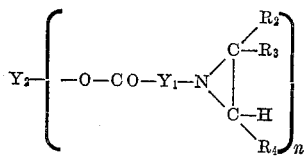

wherein $Y_1$ stands for a low molecular aliphatic hydrocarbon radical, $Y_2$ means a member of the group consisting of aliphatic hydrocarbon radicals, aliphatic hydrocarbon radicals the chain of which is interrupted by oxygen, and aliphatic hydrocarbon radicals the chain of which is interrupted by sulfur, $R_2$, $R_3$, $R_4$ stand for members of the group consisting of hydrogen and low molecular alkyl radicals, and $n$ means an integer from 2 to 4, in which process an ester selected from the group consisting of neutral sulfuric esters and sulfonic esters is used as a catalyst.

3. Polymerization products as claimed in claim 1, wherein $Y_1$ = a low molecular alkylene radical
$Y_2$ = an alkylene radical
$R_2$, $R_3$ and $R_4$ = hydrogen
$n$ = 2

4. Polymerization products as claimed in claim 1, wherein $Y_1$ = a low molecular alkylene radical
$Y_2$ = an alkylene radical interrupted by oxygen
$R_2$, $R_3$ and $R_4$ = hydrogen
$n$ = 2

5. Polymerization products as claimed in claim 1, wherein $Y_1$ = a low molecular alkylene radical
$Y_2$ = a saturated aliphatic hydrocarbon radical
$R_2$, $R_3$ and $R_4$ = hydrogen
$n$ = 3

6. Polymerization products as claimed in claim 1, wherein $Y_1$ = a low molecular alkylene radical
$Y_2$ = an alkyl radical
$R_2$, $R_3$ and $R_4$ = hydrogen
$n$ = 1

7. Process as claimed in claim 2, wherein $Y_1$ = a low molecular alkylene radical
$Y_2$ = an alkylene radical
$R_2$, $R_3$ and $R_4$ = hydrogen
$n$ = 2

8. Process as claimed in claim 2, wherein $Y_1$ = a low molecular alkylene radical
$Y_2$ = an alkylene radical interrupted by oxygen
$R_2$, $R_3$ and $R_4$ = hydrogen
$n$ = 2

9. Process as claimed in claim 2, wherein $Y_1$ = a low molecular alkylene radical
$Y_2$ = a saturated aliphatic hydrocarbon radical
$R_2$, $R_3$ and $R_4$ = hydrogen
$n$ = 3

10. Process as claimed in claim 2, wherein $Y_1$ = a low molecular alkylene radical
$Y_2$ = an alkyl radical
$R_2$, $R_3$ and $R_4$ = hydrogen
$n$ = 1

HERBERT BESTIAN.

REFERENCES CITED

The following references are of record in the file of this patent:

UNITED STATES PATENTS

| Number | Name | Date |
|---|---|---|
| 2,257,163 | Esselmann | Sept. 30, 1941 |
| 2,296,225 | Ulrich | Sept. 15, 1942 |
| 2,475,068 | Wilson | July 5, 1949 |

FOREIGN PATENTS

| Number | Country | Date |
|---|---|---|
| 461,354 | Great Britain | Feb. 15, 1937 |
| 466,344 | Great Britain | May 24, 1937 |